United States Patent Office 2,906,661
Patented Sept. 29, 1959

2,906,661

TREATING AGRICULTURAL SOILS WITH PROPARGYL PHOSPHOROTHIOATES

Joseph W. Baker and George A. Saul, Nitro, W. Va., assignors to Monsanto Chemical Company, St. Louis, Mo., a corporation of Delaware No Drawing. Application March 18, 1958
Serial No. 722,151

5 Claims. (Cl. 167—22)

This invention relates to compositions useful in the treatment of soil, particularly to compositions useful in destroying parasitic worms present in the soil, and to a method of applying the same. It further relates to the destruction of the parasitic worms known as nematodes in any of the egg, larvae and adult stages of their life cycles and particularly those harmful worms which attack crop plants and cause considerable damage thereto.

The problem of controlling harmful and unwanted parasites present in the soil, such as nematodes, is one of considerable complexity. In order to be an effective toxicant, a compound must be able to penetrate the normally impervious outer covering of the worm as well as the enclosing membranes of the larvae and eggs and to interfere with some vital function of the organism. While the exact mechanism of destroying the soil worm life is not fully understood, it is believed that the effective toxicants destroy or reduce to a low level the effectiveness of vital enzymes. A compound which is effective must be one that will remain in the soil in contact with the undesirable worm life for a sufficient period of time to effect the penetration of the worm and to destroy it by one means or another. To accomplish this result, it is necessary that the toxicant resist the destructive action of soil bacteria, be capable of wetting or penetrating the parasite, possess a substantial water dispersibility, be capable of ready mixture with the soil and possess a sufficiently low vapor pressure so that it does not evaporate before its destructive action is accomplished. Since the exacting requirements of any practical agent cannot be recognized by methods other than by test, it is necessary to observe the effectiveness of chosen compounds against the life cycle of the parasite.

In accordance with the present invention it has been discovered that propargyl phosphorothioates are highly effectve for controlling soil infesting organisms and particularly nematodes.

The compounds found to be especially effective for the intended purpose conform to the structure

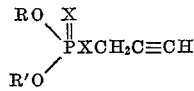

where R and R' represent lower alkyl or lower alkoxy substituted lower alkyl groups and X is a chalkogen of atomic weight less than 40, at least one X being sulfur. The method whereby the compounds of this class may be obtained is set forth and claimed in application Serial No. 576,546, filed April 6, 1956, by Baker et al.

As specific embodiments of the invention, nematocidal activity was demonstrated by preparing a suspension of the nematode *Panagrellus redivivus* in water and observing through a microscope the motility of the organisms in the presence of 0.1% of the test material. The nematode in aqueous suspension will flex its body at a regular rate and as the nematocide takes effect, the rate of flexing decreases. In the following table, employing the compounds of this invention, the loss of motility of the nematode is recorded.

Table I

| Toxicant added | Percent motility after 24 hrs. |
|---|---|
| None | 100 |
| O,O-dimethyl S(2-propargyl)phosphorodithioate | 0 |
| O,O-bis(2-methoxyethyl)-S-(2-propargyl)phosphorodithioate | 0 |
| O,O-diethyl S(2-propargyl)phosphorothioate | 5 |
| O,O-diethyl O(2-propargyl)phosphorothioate | 0 |

In another experiment sterilized soil was infested with nematodes (Meloidogyne sp.) and different portions treated with solutions containing different concentrations of O,O - dimethyl S(2 - propargyl)phosphorodithioate. After standing for a week, two-week old tomato plants were transplanted in the test soil and also in untreated, heat-sterilized soil. The plants were allowed to grow for two months, then were harvested, the roots washed and examined for evidence of infection. Comparison to the untreated controls gave the phytotoxicity of the compound. For convenience in recording the index of infection and phytotoxicity in the table below, the following rating keys were used:

| Infestation | Phytotoxicity |
|---|---|
| 1—No infection. | 0—No evidence of phytotoxicity. |
| 2—Infection, barely recognized. | 1—Slight toxicity. |
| 3—Light infection. | 2—Moderate toxicity. |
| 4—Medium infection. | 3—Severely toxic. |
| 5—Heavy infection. | 4—No plant survival. |

Table II

| Conc., percent | Infestation | Phytotoxicity |
|---|---|---|
| 0.1 | 1 | 0 |
| 0.01 | 1 | 0 |
| 0.005 | 2 | 0 |

In actual usage any of the compounds within the preferred class described may be added to the soil in solution, as an emulsion or water dispersion but preferably is added in a solid formulation wherein the active nematocide is distributed over some dry and permanently free-flowing powder such as the clays, including bentonite and attapulgite or such materials as talc, diatomaceous earth, fuller's earth, chalk, calcium carbonate and the like. These diluents possess the added advantage of lower cost treatment since normally they comprise more than 50% up to 98% of the complete formulation and thereby provide a means of more even distribution of the active material over a wider area and in the effective quantities required. These nematocidal compositions will of course attack the soil phase of the life cycle of nematode parasites which infest animals. Treating barnyards, chicken pens, stables and other infested areas destroys eggs and infective larvae of many parasites which infest animals. Moreover, the compositions are effective for the control of nematodes in their environment which includes bodies of animals. They are toxic to other worms such as flukes and tapeworms.

In the use of propargyl phosphorothioates as nematocides or soil fumigants the active compound, diluted or undiluted, may be applied to the soil at rates of 10 to 500 pounds per acre. The preferred application for treating soils of average nematode infestation will be from 25 to 100 pounds per acre. The formulation may contain dispersants which aid uniform distribution.

It is intended to cover all changes and modifications of the examples of the invention herein chosen for purposes of disclosure which do not constitute departures from the spirit and scope of the invention.

What is claimed is:

1. The method of destroying parasitic worm life in nematode infested agricultural soils which comprises contacting the said organism with a toxic concentration of a compound of the structure

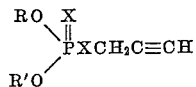

where R and R' are selected from the group consisting of lower alkyl and lower alkoxy substituted lower alkyl groups and X represents a chalkogen of atomic weight less than 40, at least one of which is sulfur.

2. The method of destroying parasitic worm life in nematode infested agricultural soils which comprises contacting the said organism with a toxic concentration of a compound of the structure

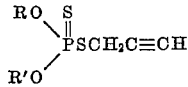

where R and R' represent alkyl groups containing less than 3 carbon atoms.

3. The method of destroying parasitic worm life in nematode infested agricultural soils which comprises contacting the said organism with a toxic concentration of a compound of the structure

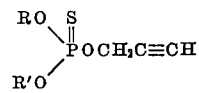

where R and R' represent alkyl groups containing less than 3 carbon atoms.

4. The method of destroying parasitic worm life in nematode infested agricultural soils which comprises contacting the said organism with a toxic concentration of a compound of the structure

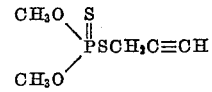

5. The method of destroying parasitic worm life in nematode infested agricultural soils which comprises contacting the said organism with a toxic concentration of a compound of the structure

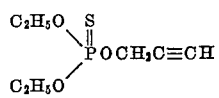

References Cited in the file of this patent

UNITED STATES PATENTS

| | | |
|---|---|---|
| 2,818,366 | Birnum | Dec. 31, 1957 |
| 2,818,368 | Kosmin | Dec. 31, 1957 |